(12) United States Patent
Liu et al.

(10) Patent No.: US 12,706,337 B2
(45) Date of Patent: Aug. 11, 2026

(54) SHAPED ELECTRODE FOR ARRESTING ELECTRODE MOVEMENT

(71) Applicant: Apple Inc., Cupertino, CA (US)

(72) Inventors: Zuqin Liu, Sunnyvale, CA (US); Shabab Amiruddin, Pacifica, CA (US); Aswin Karthik Manohar, Newark, CA (US); Hongxia Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 796 days.

(21) Appl. No.: 17/945,715

(22) Filed: Sep. 15, 2022

(65) Prior Publication Data

US 2024/0097248 A1 Mar. 21, 2024

(51) Int. Cl.

*H01M 50/14* (2021.01)
*H01M 10/04* (2006.01)
*H01M 50/131* (2021.01)
*H01M 50/531* (2021.01)

(52) U.S. Cl.

CPC ......... *H01M 50/14* (2021.01); *H01M 10/049* (2013.01); *H01M 50/131* (2021.01); *H01M 50/531* (2021.01)

(58) Field of Classification Search

CPC .. H01M 50/14; H01M 50/131; H01M 50/531; H01M 10/49

See application file for complete search history.

(56) References Cited

U.S. PATENT DOCUMENTS 6,743,546 B1 6/2004 Kaneda et al.
2009/0136842 A1 5/2009 Hirota
2012/0115020 A1 5/2012 Hwang
2013/0202932 A1 8/2013 Song et al.
2014/0079984 A1* 3/2014 Kajitani ................ H01M 4/668 429/162
2015/0072173 A1* 3/2015 Byun ................. H01M 50/291 429/7
2019/0326567 A1* 10/2019 Hur ..................... H01M 50/211
2021/0234203 A1 7/2021 Jang et al.
2022/0045404 A1 2/2022 Akizuki et al.

FOREIGN PATENT DOCUMENTS

JP 5552391 5/2014
KR 20110030395 A 3/2011

OTHER PUBLICATIONS

"English Translation of KR 20110030395 A", Mar. 23, 2011, 80 pages (42 pages of English translation and 38 pages of official language copy).
U.S. Appl. No. 17/945,713, Final Office Action, Mailed On Jul. 11, 2025, 26 pages.
U.S. Appl. No. 17/945,713, Non-Final Office Action, Mailed On Apr. 1, 2025, 22 pages.

* cited by examiner

*Primary Examiner* — Olatunji A Godo
(74) *Attorney, Agent, or Firm* — Kilpatrick Townsend & Stockton LLP

(57) ABSTRACT

A battery may include an enclosure that defines an interior volume, an electrode cell disposed within the interior volume, and a pair of retaining elements. The electrode cell may include a pair of notches formed therein. The pair of retaining elements may be disposed within volumes defined by the pair of notches. The pair of retaining elements may be connected to the enclosure and may be configured to engage with a respective notch of the pair of notches to arrest movement of the electrode cell with respect to the enclosure.

20 Claims, 7 Drawing Sheets

900
946(2)
946(1)

800
846(1)
846(2)

700
746(1)
746(2)
746(3)
746(4)

600
646(1)
646(2)
646(3)
646(4)

SHAPED ELECTRODE FOR ARRESTING ELECTRODE MOVEMENT

CROSS-REFERENCES TO RELATED APPLICATIONS

This application is related to U.S. patent application Ser. No. 17/945,713 entitled "SHAPED BATTERY COMPONENTS FOR ARRESTING ELECTRODE MOVEMENT."

BACKGROUND

Batteries are used in many devices. Portable devices (e.g., media players, smartphones, watches, tablets, etc.), for example, may include one or more rechargeable batteries. By virtue of these devices being portable, they are carried, flipped, jostled, shaken, and otherwise moved around. In certain cases, such movement may be more severe, such as, dropping of the device that includes the battery. Such repeated movement and albeit less frequent severe movement may result in damage to internal components, including batteries.

BRIEF SUMMARY

One general aspect includes a battery. The battery includes an enclosure that defines an interior volume, where a first pair of notches is formed in the enclosure, where each notch of the first pair of notches includes a protrusion that extends into the interior volume. The battery also includes an electrode cell disposed within the interior volume, where a second pair of notches is formed in the electrode cell, where the first pair of notches is aligned with the second pair of notches, where each protrusion is configured to engage with one notch of the second pair of notches when the electrode cell moves within the enclosure.

Another general aspect includes a system. The system includes an electrode cell including a plurality of electrode layers, where a pair of electrode notches is formed in the electrode cell, where each electrode notch of the pair of electrode notches extends through the plurality of electrode layers, where the electrode cell is configured to occupy an enclosure. The system also includes a first electrode tab electrically connected to the electrode cell. The system also includes a second electrode tab electrically connected to the electrode cell.

Another general aspect includes a battery. The battery includes an enclosure defining an interior volume and characterized by an enclosure perimeter, where a plurality of enclosure protrusions is formed in the enclosure at the enclosure perimeter. The battery also includes an electrode stack including a plurality of electrode layers disposed within the interior volume and characterized by a stack perimeter, where a plurality of electrode protrusions is formed in the electrode stack at the stack perimeter, and where the plurality of electrode protrusions is aligned with the plurality of enclosure protrusions.

Another general aspect includes a battery. The battery includes an enclosure that defines an interior volume. The battery also includes an electrode cell disposed within the interior volume, where a pair of notches is formed in the electrode cell. The battery also includes a pair of retaining elements, where each retaining element of the pair of retaining elements is disposed within and extends outward from a respective notch of the pair of notches, where each retaining element of the pair of retaining elements is connected to the enclosure, and each retaining element of the pair of retaining elements is configured to engage with a respective notch of the pair of notches to arrest movement of the electrode cell with respect to the enclosure.

Another general aspect includes a system. The system includes an electrode cell including a plurality of electrode layers, where a pair of electrode notches is formed in the electrode cell, where each electrode notch of the pair of electrode notches extends through the plurality of electrode layers. The system also includes a pair of retaining elements configured to retain the electrode cell via engagement with the pair of electrode notches. The system also includes a first electrode tab electrically connected to the electrode cell. The system also includes a second electrode tab electrically connected to the electrode cell.

Another general aspect includes a battery. The battery includes an enclosure defining an interior volume and characterized by an enclosure perimeter. The battery also includes an electrode stack including a plurality of electrode layers disposed within the interior volume and characterized by a stack perimeter, where an electrode protrusion is formed in the electrode stack at the stack perimeter and defines an electrode protrusion volume. The battery also includes a retaining element occupying a portion of the electrode protrusion volume adjacent the enclosure perimeter and configured to arrest movement of the electrode stack relative to the enclosure.

BRIEF DESCRIPTION OF THE DRAWINGS

A further understanding of the nature and advantages of the disclosed examples may be realized by reference to the remaining portions of the specification and the drawings.

Figure 1:
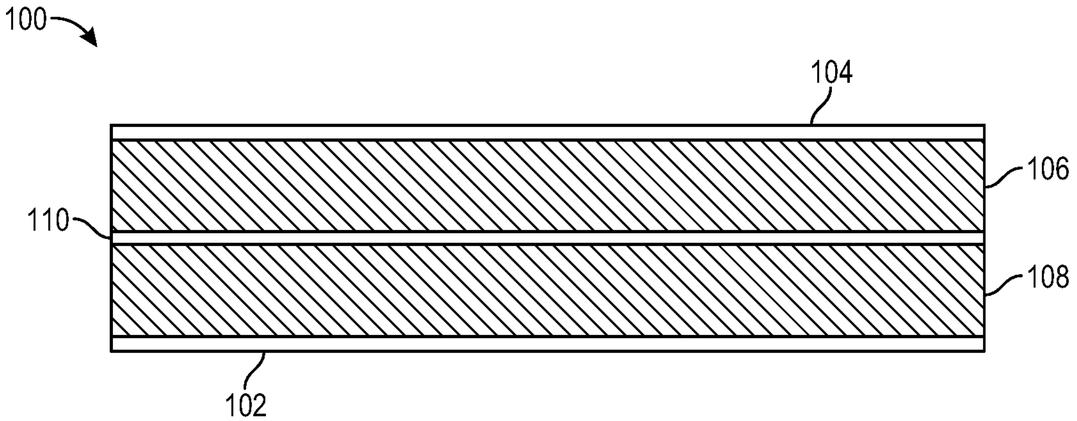
FIG. 1 shows a schematic cross-sectional view of materials for an energy storage device or battery cell 100, according to at least one example.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed to be housed within an enclosure such as a rigid can or a pliable composite pouch. The enclosure functions to retain internal components of the battery including, for example, an electrode stack and liquid electrolyte. The enclosure is sealed to prevent the electrolyte from leaving the enclosure. To account for an appropriate ratio of electrolyte to electrode stack material, the absorption rate at which the electrolyte is absorbed by the electrode stack material, and other design considerations, the enclosure is designed to be slightly larger than the electrode stack. In some cases, so called void volume may be provided in the enclosure to account for the considerations identified above.

Batteries in portable electronic devices may be subjected to various repeated movements and some more severe movements (e.g., a device drop). A device drop may cause the electrode stack to move within the enclosure. For example, the entire stack may slide towards one end of the enclosure, the stack may tip such that leading edge of the stack contacts the enclosure (e.g., in the direction of the drop), and the like. Movement of the electrode stack within the enclosure can result in multiple different failure scenarios. For example, the pouch or enclosure may crack, resulting in electrolyte leaking out of the pouch. The electrodes that extend out of the enclosure may be shorted and/or broken, internal shorts may be caused, and other associated problems. Additionally, other seals within the enclosure may be damaged. Such damage may be exacerbated by repeated, albeit less severe, movement of the electrode stack. Thus, restraining or otherwise resisting movement of the electrode stack with respect to the enclosure would be beneficial.

The technology described herein aims to solve these technical problems by changing the structure of the electrode stack and, in some examples, the enclosure itself to physically arrest movement of the electrode stack with respect to the enclosure. This solution may be applicable to rectangular batteries and to batteries with less traditional geometries (conformal designs, L shaped, for example). Additionally, the described technology ensures that movement of the entire electrode stack is restrained, as compared to solutions that attempt to secure one side of the stack to an interior surface of the enclosure (e.g., using an adhesive tape) and result in a non-uniform movement (e.g., upper layers moving within stack, while bottom-most layer remains secured to the interior surface). Solutions that use adhesive tape may also reduce the energy density of the battery cell because volume of the enclosure would need to be dedicated to the volume occupied by the tape. The described technology results in a lower reduction in battery cell volume as compared to the tape solution. To the extent there is movement, the electrode stack may move more or less as unitary body, rather than tipping over when one side is secured to the enclosure, which reduces the possibility of internal shorting and other safety concerns associated with shorting batteries.

Turning now to a first particular example, in this example is provided a battery that includes an enclosure and an electrode stack each configured to arrest movement of the electrode stack within the enclosure. The electrode stack is formed to include a pair of notches on opposite sides of the stack. Each notch may extend completely through all layers of the stack (e.g., all anode layers, all cathode layers, and all separator layers). For example, the notch may have a rectangular shape protruding inwards towards a central region of the stack. The enclosure may be formed to include corresponding notches that are sized and positioned at side walls of the enclosure to protrude within the larger notches in the electrode stack. In this configuration, when the battery is subjected to movement, the sets of notches may uniformly distribute forces and arrest movement of the electrode stack. Thus, rather than the stack moving within the enclosure and striking an opposite end of the enclosure (e.g., at a seal location where a pair of electrode terminals is located), the stack may engage with the enclosure at the notch locations. The notches thereby function as speed bumps to arrest large movements of the electrode. The notches also resist movement of the electrode stack that might occur over time because the notches effectively cause the electrode stack to reset back to an initial position after movement. In a rectangular battery embodiment, the sets of notches may be formed at any side of the battery, which may include one or more pairs of notches in first opposing sides and one or more pairs of notches in second opposing sides. The sets of notches may also be formed at corners of the battery.

Turning now to a second particular example, in this example is provided a battery that includes an electrode stack that has been configured to arrest movement of the electrode stack within an enclosure. In this example, the enclosure is generally not modified. The electrode stack, however, may include notches similar to those described in the first particular example. Thus, the notches may extend through the entire electrode stack. As part of manufacturing the battery, the electrode stack may be placed within a portion of the enclosure and a set of retaining elements may be installed within the voids formed by the notches in the electrode stack. The retaining elements may include plastic, glue, rubber, and the like that occupy a majority of the voids and also are secured (e.g., glued, adhered, welded, etc.) to opposite interior surfaces of the enclosure. In this manner, the retaining elements may function to "pin" the electrode stack within the enclosure. The retaining elements thereby function as speed bumps to arrest large movements of the electrode. The retaining elements also resist movement of the electrode stack that might occur over time because the retaining elements effectively cause the electrode stack to reset back to an initial position after movement. In a rectangular battery embodiment, the sets of notches and corresponding retaining elements may be formed at any side of the battery, which may include one or more pairs of notches and corresponding retaining elements in first opposing sides and one or more pairs of notches and corresponding retaining elements in second opposing sides. The sets of notches and corresponding retaining elements may also be formed at corners of the battery.

Although the remaining portions of the description may reference lithium-ion batteries for use in portable electronic devices, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, motor vehicles and other transportation equipment, as well as other devices that may benefit from the use of the variously described battery technology.

FIG. 1 depicts a schematic cross-sectional view of materials for an energy storage device or battery cell 100, according to at least one example. Battery cell 100 may be or include an electrode stack, and may be one of a number of stacks coupled together to form a battery structure. As would be readily understood, the layers are not shown at any particular scale, and are intended merely to show the possible layers of cell material of one or more cells that may be incorporated into an energy storage device. As shown in FIG. 1, battery cell 100 includes a first current collector 102 and a second current collector 104. In some examples, one or both of the current collectors may include a metal or a non-metal material, such as a polymer or composite that may include a conductive material. The first current collector 102 and second current collector 104 may be different materials in examples. For example, in some examples, the first current collector 102 may be a material selected based on the potential of an anode active material 106, and may be or include copper, stainless steel, or any other suitable metal, as well as a non-metal material including a polymer. The second current collector 104 may be a material selected based on the potential of a cathode active material 108, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 106 may be silicon, graphite, carbon, a tin alloy, lithium metal, a lithium-containing material, such as lithium titanium oxide, or other suitable materials that can form an anode in a battery cell. Additionally, for example, the cathode active material 108 may be a lithium-containing material. In some examples, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other examples the lithium-containing material can be a lithium iron phosphate, or other suitable materials that can form a cathode in a battery cell.

The first and second current collectors as well as the active materials may have any suitable thickness. A separator 110 may be disposed between the electrodes, and may be a polymer film, oxide film, or a material that may allow lithium ions to pass through the structure while not otherwise conducting electricity. Active materials 106 and 108 may additionally include an amount of electrolyte in a completed cell configuration, which may be absorbed within the separator 110 as well. The electrolyte may be a liquid including one or more salt compounds that have been dissolved in one or more solvents. The salt compounds may include lithium-containing salt compounds in examples, and may include one or more lithium salts including, for example, lithium compounds incorporating one or more halogen elements such as fluorine or chlorine, as well as other non-metal elements such as phosphorus, and semimetal elements including boron, for example.

In some examples, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about $5^{-10}$ mS/cm.

Although illustrated as single layers of electrode material, battery cell 100 may be any number of layers. Although the cell may be composed of one layer each of anode and cathode material as sheets, the layers may also be formed into any form such that any number of layers may be included in battery cell 100. For examples which include multiple layers, tab portions of each anode current collector may be coupled together, as may be tab portions of each cathode current collector, although one or more of the current collectors may be a continuous current collector material as will be described below. Once the cell has been formed, a pouch, housing, or enclosure may be formed about the cell to contain electrolyte and other materials within the cell structure. Terminals may extend from the enclosure to allow electrical coupling of the cell for use in devices, including an anode and cathode terminal. The coupling may be directly connected with a load that may utilize the power, and in some examples the battery cell may be coupled with a control module that may monitor and control charging and discharging of the battery cell. When multiple cells are stacked together, electrode terminals at anode potential may be coupled together, as may be electrode terminals at cathode potential. These coupled terminals may then be connected with the terminals on the enclosure as noted above.

The structure of battery cell 100 may also illustrate the structure of a solid-state battery cell, which may include anode and cathode materials as well as current collectors as noted previously. A difference between the solid-state design and liquid-electrolyte design previously explained is that in addition to not including electrolyte, separator 110 may be characterized by different materials, although the materials may be characterized by similar properties, such as the ability to pass ions through the material while limiting the passage of electrons. In solid-state configurations, the anode and cathode materials may be any of the materials noted above, as well as additional materials operable as electrode active materials within a solid-state cell. For example, anode materials may include graphene or carbon materials, lithium metal, titanium-containing materials, lithium alloys, as well as other anode-compatible materials. Cathode materials may include lithium-containing oxides or phosphates, as well as other cathode-compatible materials. The inter-electrode material, which may also be noted as 110, may include an electron-blocking material, such as a separator, as well as or alternatively, a solid electrolyte material having ion mobility. Glass materials and ceramics may be used, as well as polymeric materials that may include ion-conducting additives, such as lithium salts. In any instance where the word separator is used, it is to be understood as encompassing both separators and solid electrolytes, which may or may not incorporate separator materials. FIG. 1 is included as an exemplary cell that may be incorporated in batteries according to the present technology. It is to be understood, however, that any number of battery and battery cell designs and materials that may include charging and discharging capabilities similarly may be encompassed by or incorporated with the present technology.

Figure 2:
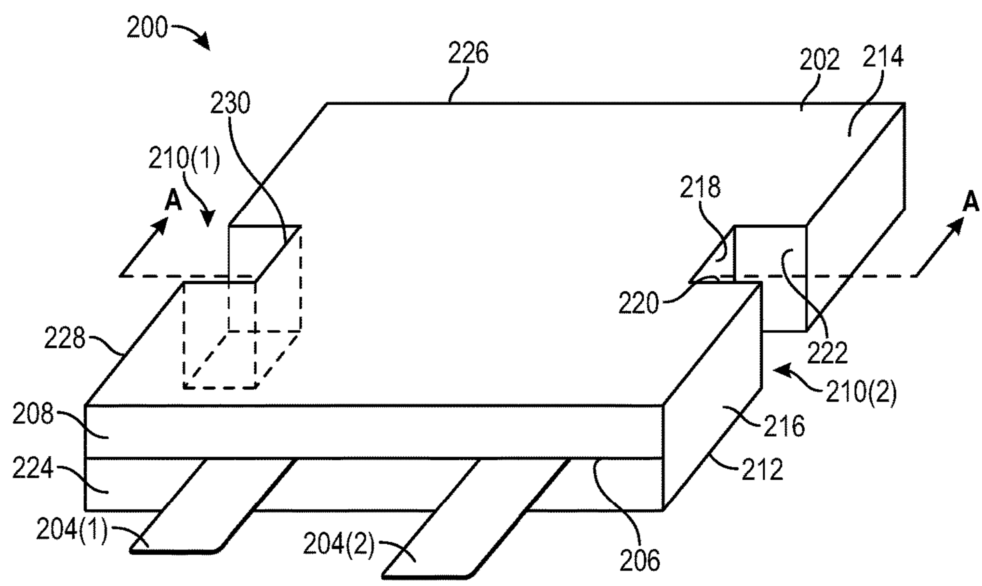
FIG. 2 shows a perspective view of a battery including movement arresting features, according to at least one example.

FIG. 2 shows a perspective view of a battery 200 including movement arresting features, according to at least one example. The battery 200 in particular may include an enclosure 202 that is configured to house a battery cell 201 (shown in FIG. 3) such as the battery cell 100 described herein and electrolyte material. The battery 200 may also include a pair of electrode tabs 204. The pair of electrode tabs 204 may be electrically connected to the battery cell 100. For example, the electrode tab 204(1) may be connected to the anode electrodes and the electrode tab 204(2) may be cathode electrodes. The arrangement may also be reversed. The pair of electrode tabs 204 may extend from within an internal volume of the enclosure 202 to a location outside of the enclosure 202. For example, as illustrated, the pair of electrode tabs 204 may extend through the enclosure 202 at a seam 206 formed in a first side 208 of the enclosure 202. The enclosure 202 itself, including the seam 206, may be hermetically sealed to prevent leakage of the electrolyte material, gases, and the like that are present within the enclosure 202 and to prevent intrusion of air or liquid contaminants into the enclosure 202. In some examples, during drop events, the seam 206 may be a location of potential failure.

The enclosure 202 may be a pouch formed from a composite material such as a thin aluminum sheet sandwiched between two polymer layers. The composite material may be generally pliable and can be wrapped around the battery cell 100 and sealed at the seam 206 using conventional methods.

The enclosure 202 may also be a can formed from a single type of rigid material such as stainless steel or aluminum. The can may include a single part that is sealed at the seam 206 after installation of the battery cell 100, or may be formed from multiple pieces (e.g., a bottom and a lid). In some examples, the seam 206 may be located at a different location and may extend along multiple sides of the enclosure 202. The enclosure 202, when formed as the can, may be extruded, pressed, or otherwise formed from a rigid material.

The enclosure 202 may have any uniform or non-uniform conformal shape, including rectangular, cylindrical, spherical, and the like. In some examples, the enclosure 202 may have multiple parts extending in different directions, e.g., a conformal enclosure 202 that includes a first part extending in a first direction and a second part connected to the first part and extending about orthogonally with respect to the first part. As illustrated, the enclosure 202 may be defined by a bottom surface 212, a top surface 214, a front surface 224, a back surface 226, a side surface 216, and a side surface 228.

As illustrated, one or more enclosure notches 210 may be defined in the enclosure 202. In some examples, the enclosure notches 210 may be formed as a uniform pair and placed symmetrically with respect to each other. This may enable the enclosure notches 210 to uniformly arrest movement within the enclosure 202. Each enclosure notch 210 may be defined by a three-dimensional protrusion that extends into an interior volume of the enclosure 202. As an example, the enclosure notch 210(2) may have a height that extends between the bottom surface 212 (e.g., a first surface) and the top surface 214 (e.g., a second surface) of the enclosure 202, a width that extends between a third surface 216 (e.g., a side surface) and a fourth surface 218, and a depth that extends between a fifth surface 220 and a sixth surface 222. In some examples, the enclosure notch 210(1) may be sized, oriented, and positioned in the side surface 228 similarly as the enclosure notch 210(2) is in the side surface 216 (e.g., directly across the enclosure from each other). As described herein, the number, size, and shape of the enclosure notches 210 may be selected depending on the design objectives of the embodiment. For example, two notches of uniform columnar shape, as shown in FIG. 2, may be suitable for arresting movement of a rectangular battery cell. A cross-sectional view A-A of the battery 200 is shown in FIG. 3.

Figure 3:
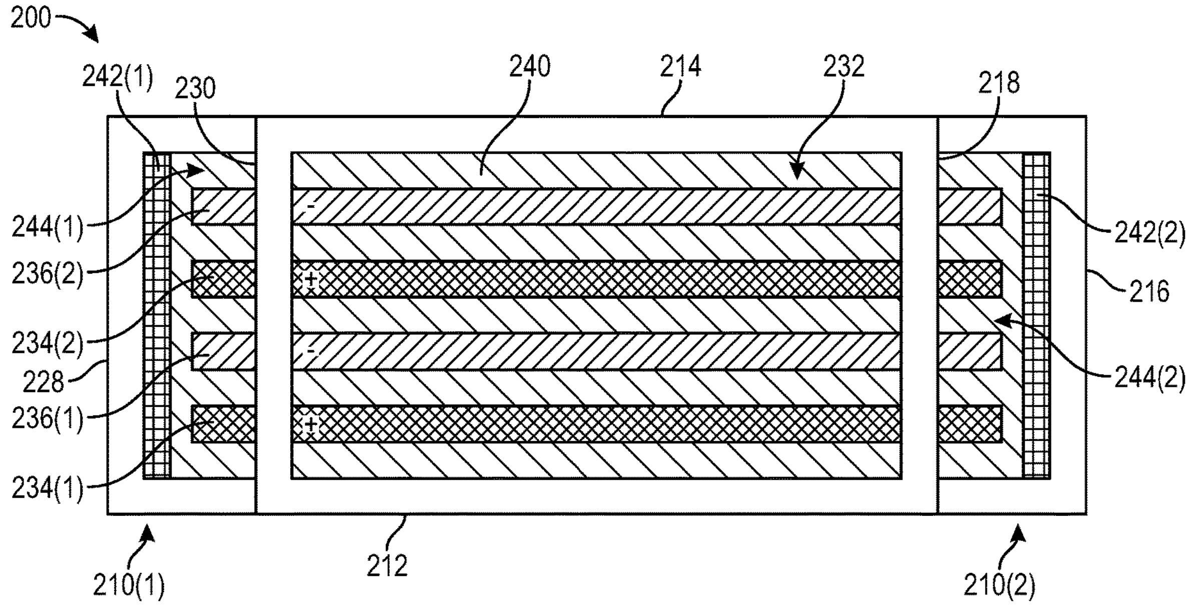
FIG. 3 shows a schematic cross-sectional view of the battery of FIG. 2, according to at least one example.

FIG. 3 shows a schematic of the cross-sectional view A-A of the battery 200 of FIG. 2, according to at least one example. As illustrated, the view in FIG. 3 cuts through the enclosure notches 210 between the surfaces 218 and 230. The view in FIG. 3 depicts aspects of the battery cell 232 within the enclosure 202. The battery cell 232 is an example of the battery cell 100. To this end, the battery cell 232, which is illustrated as a stack of electrodes, may include positive electrode layers 234, negative electrode layers 236, and a separator 240. While a few layers 234 and 236 are shown, it should be understood that any suitable number of layers may be included. In some examples, the layers 234, 236 and the separator 240 may be formed as a roll (e.g., a jelly roll form factor).

The enclosure notches 210, as shown in FIG. 3, extend through the enclosure 202. Similarly, as shown in FIG. 3, the battery cell 232 includes battery cell notches 244(1) and 244(2) that extend through each layer of the battery cell 232. As the enclosure notches 210 in the enclosure 202 are formed using a first technique and have a first size, they may be referred to as enclosure notches. The battery cell notches 244 formed in the battery cell 232 may be referred to as electrode stack notches, battery cell notches, and other similar notations to distinguish from the enclosure notches 210 formed in the enclosure. The enclosure notches 210 in the enclosure may be sized slightly larger than the battery cell notches 244. In this manner, the structure in the enclosure that has been "notched" may be referred to as a protrusion that protrudes, extends, and/or otherwise occupies a portion of the volume defined by the battery cell notches 244 (e.g., area that would have been part of the battery cell 232 if it had not been removed as part of a manufacturing process, according to the technology described herein). The dimensions of the battery cell notches 244 may be defined as having dimensions (depth, width, and length) similar to, but slightly smaller than the enclosure notches 210.

FIG. 3 also shows that an interior volume of the battery 200 may include void volume portions 242, which may be distributed throughout the interior volume. In some examples, the void volume portions 242 may be greater in some areas than in others. The void volume portions 242 may be provided within the enclosure 202 to account for the rate at which the electrolyte is absorbed by the active material. For example, at least a portion of the electrolyte may occupy the void volume portions 242 when the battery 200 is first manufactured, but after some period of time, the electrolyte may move from the void volume portions 242 into the active material in the cell. The electrode cell 232 may move within the void volume portions 242, but the technology described herein may arrest this type of movement to keep the electrode cell 232 from moving into the void volume portions 242. For example, too much movement of the electrode cell 232 into the void volume portions 242 of the interior volume may cause the problems described herein.

Figure 4:
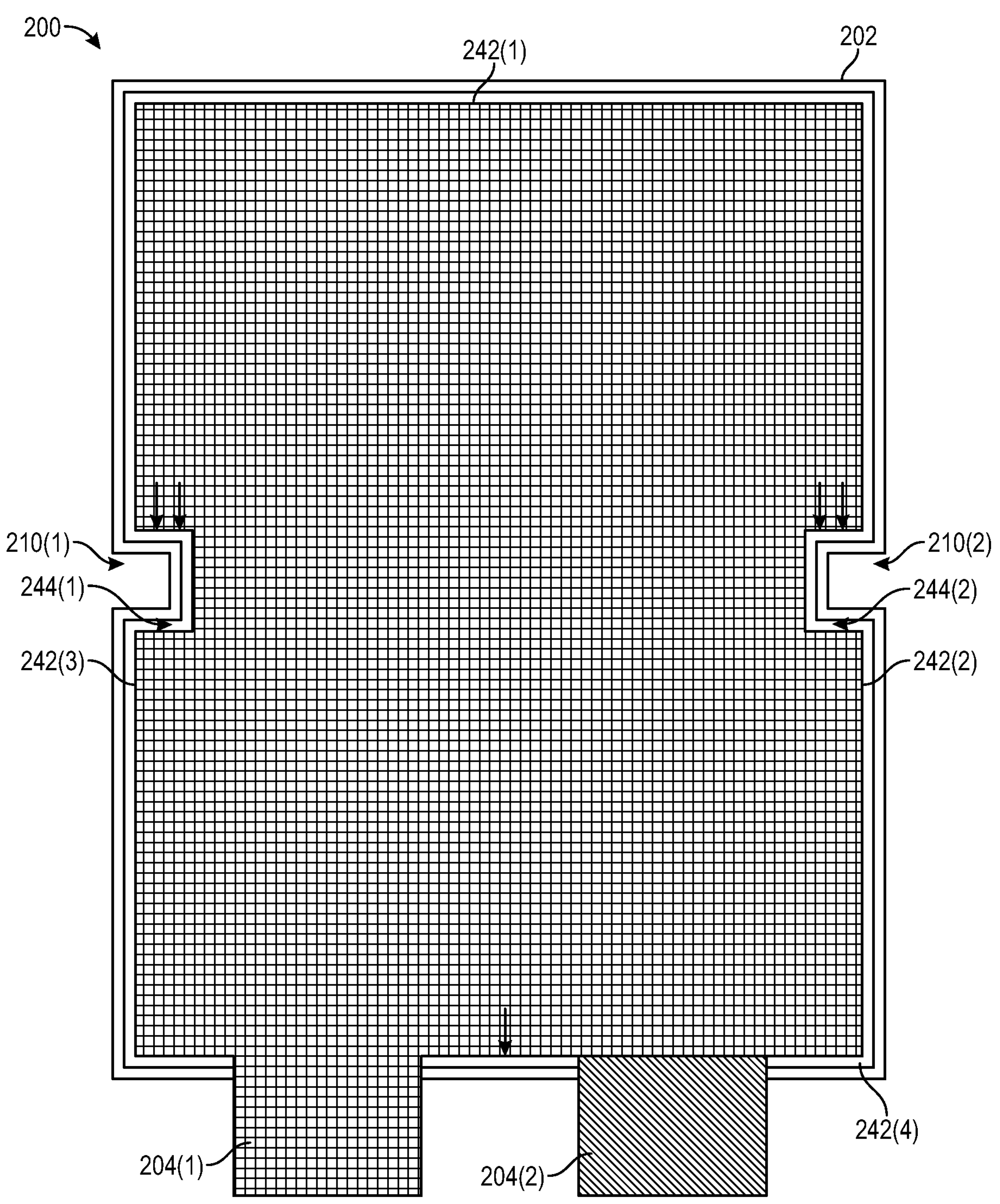
FIG. 4 shows a schematic view of a battery including movement arresting features, according to at least one example.

FIG. 4 shows a schematic view of the battery 200 including movement arresting features, according to at least one example. The battery 200 in FIG. 4 is illustrated without the top surface 214 removed to reveal a top-most electrode that is connected to the electrode tab 204(1). The electrode tab 204(2) is also illustrated. In FIG. 4, the void volume portion 242 is depicted as void volume portions 242(1)-242(4). In some examples, the width of the void volume portions 242(1) and (4) (e.g., a distance between the enclosure and the electrode stack) may be between 0.15 and 0.30 mm. In some examples, the width of the void volume portions 242(1) and (4) may be less than 0.15 or greater than 0.30 mm (e.g., around 0.25 mm). In some examples, the width of the void volume portions 242(2) and (3) may be less than the width of the void volume portions 242(1) and (4).

FIG. 4 depicts the enclosure notches 210 and the battery cell notches 244. As shown, the enclosure notches 210 may be substantially symmetrically with respect to location, size, and orientation of each other. Likewise, the battery cell notches 244 may be substantially symmetrically with respect to location, size, and orientation of each other. This may provide for uniform distribution of drop forces, as shown by the small arrows. For example, when the battery 200 is dropped with the electrode tabs 204 facing down (as shown), the forces exerted by the electrode stack contacting the interior surfaces of the enclosure 202 may be distributed as shown, e.g., with some force being born by interior surfaces of the battery cell notches 244 physically contacting exterior surfaces of the enclosure notches 210 and some being born at the end. This distribution may be substantially uniform. In some examples, only one enclosure notch 210 and one battery cell notch 244 may be included in the battery 200. Such a configuration, however, may result in non-uniform distribution of resistive forces. In some examples, any suitable number of enclosure notches 210 and battery cell notches 244 may be provided in the battery 200. For example, an additional set of enclosure notches 210 and battery cell notches 244 may be placed in the same sides as illustrated in FIG. 4. Similarly, additional enclosure notches 210 and battery cell notches 244 may be placed in opposite sides of the battery 200. For example, a first enclosure notch 210 and corresponding battery cell notch 244 may be placed in the end opposite the electrode tabs 204. In this example, a second enclosure notch 210 and corresponding battery cell notch 244 may be placed in the end that includes the electrode tabs 204 (e.g., spaced between the electrode tab 204(1) and the electrode tab 204(2).

Figure 5:
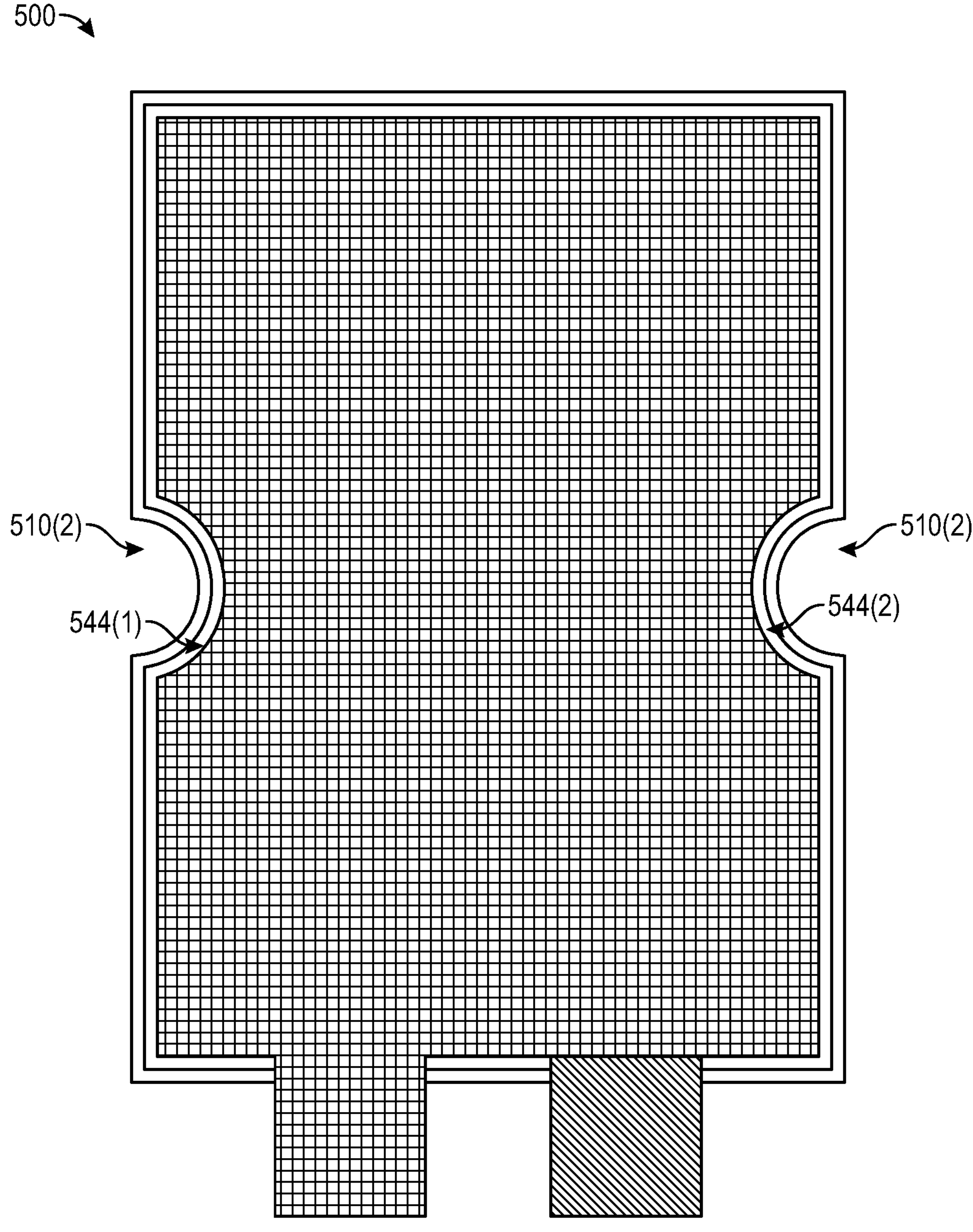
FIG. 5 shows a schematic view of a battery including movement arresting features, according to at least one example.

FIG. 5 shows a schematic view of a battery 500 including movement arresting features, according to at least one example. The battery 500 is an example of the battery 200. In FIG. 5, however, the battery 500 includes a set of enclosure notches 510 having a semi-circular shape and correspondingly-shaped battery cell notches 544. As the enclosure notches 510 and battery cell notches 544 are three-dimensional, the illustrated shape may be referred to semi-cylindrical shape (e.g., a portion of a cylinder). In some examples, the size, shape, position, and orientation of the enclosure notches 510 may correspond to the size, shape, position, and orientation of the battery cell notches 544. In some examples, more than two enclosure notches 510 and corresponding battery cell notches 544 may be provided in the battery 500.

Figures 6, 7, 8, 9:
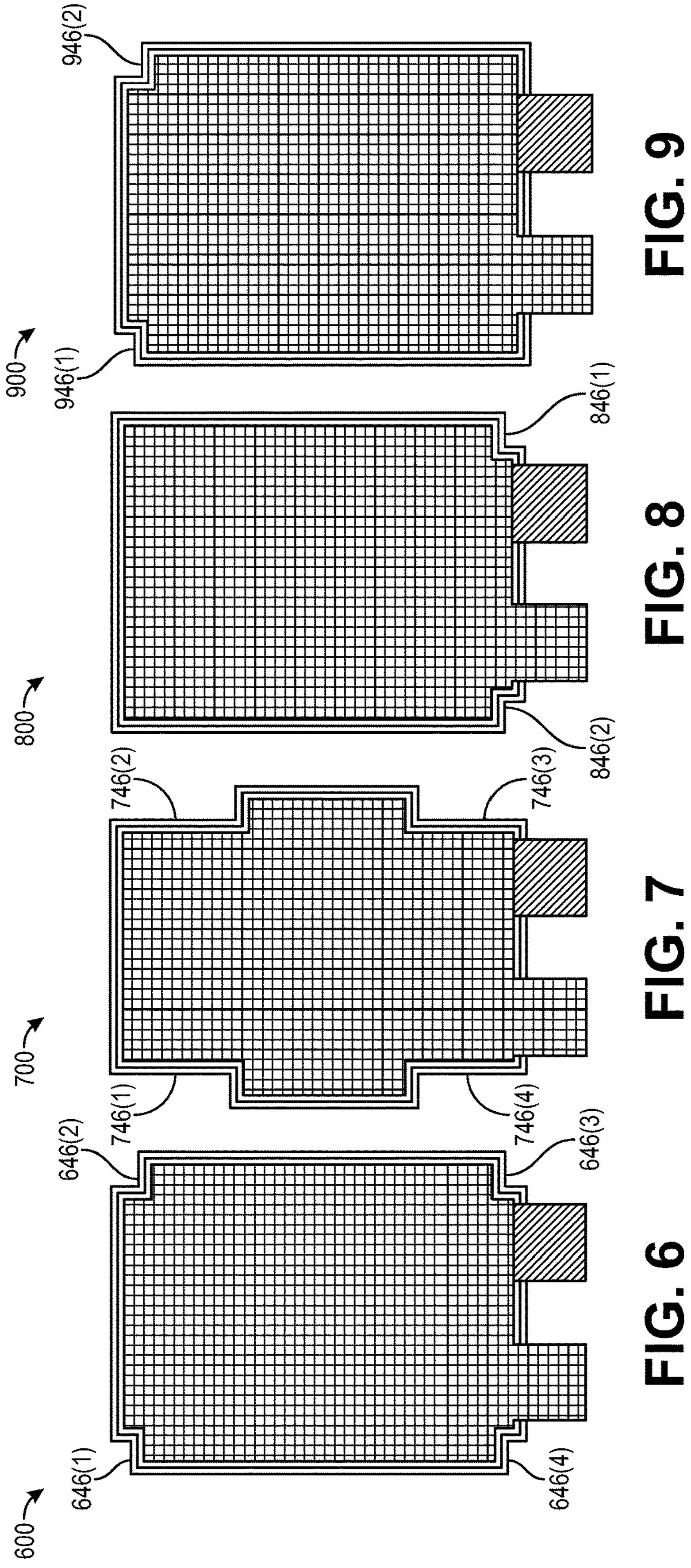
FIG. 6 shows a schematic view of a battery including movement arresting features, according to at least one example.
FIG. 7 shows a schematic view of a battery including movement arresting features, according to at least one example.
FIG. 8 shows a schematic view of a battery including movement arresting features, according to at least one example.
FIG. 9 shows a schematic view of a battery including movement arresting features, according to at least one example.

FIG. 6 shows a schematic view of a battery 600 including movement arresting features, according to at least one example. The battery 600 is an example of the battery 200. In FIG. 6, however, the battery 600 includes a set of enclosure notches and a set of corresponding battery cell notches, referred to collectively herein as battery notches 646. The battery notches 646, which may be of any suitable shape or size, may be located at corners of the battery 600. In this example, the battery notches 646 may include protrusions having only two sides, rather than the those that include three sides, as illustrated in FIG. 2. The battery notches 646 may arrest movement in multiple directions.

FIG. 7 shows a schematic view of a battery 700 including movement arresting features, according to at least one example. The battery 700 is an example of the battery 200. In FIG. 7, however, the battery 700 includes a set of enclosure notches and a set of corresponding battery cell notches, referred to collectively herein as battery notches 746. The battery notches 746, which may be of any suitable shape or size, may be located at corners of the battery 700 and extend along sides of the battery 700 at a length of about ⅓ of the length of the side of the battery 700. As illustrated, the battery notches 746 may have a generally rectangular shape. In this example, the battery notches 746 may include protrusions having only two sides, rather than the those that include three sides, as illustrated in FIG. 2. The battery notches 746 may arrest movement in multiple directions.

FIG. 8 shows a schematic view of a battery 800 including movement arresting features, according to at least one example. The battery 800 is an example of the battery 200. In FIG. 8, however, the battery 800 includes a set of enclosure notches and a set of corresponding battery cell notches, referred to collectively herein as battery notches 846. The battery notches 846, which may be of any suitable shape or size, may be located at subset of the corners of the battery 800 such as those that are adjacent the electrode terminals. As illustrated, the battery notches 846 may have a generally rectangular shape. In this example, the battery notches 846 may include protrusions having only two sides, rather than the those that include three sides, as illustrated in FIG. 2. The battery notches 846 may primarily arrest movement in a direction towards the electrode terminals.

FIG. 9 shows a schematic view of a battery 900 including movement arresting features, according to at least one example. The battery 900 is an example of the battery 200. In FIG. 9, however, the battery 900 includes a set of enclosure notches and a set of corresponding battery cell notches, referred to collectively herein as battery notches 946. The battery notches 946, which may be of any suitable shape or size, may be located at subset of the corners of the battery 900 such as those that are at adjacent an end of the battery 900 opposite the electrode terminals. As illustrated, the battery notches 946 may have a generally rectangular shape. In this example, the battery notches 946 may include protrusions having only two sides, rather than the those that include three sides, as illustrated in FIG. 2. The battery notches 946 may primarily arrest movement in a direction away from the electrode terminals.

Figure 10:
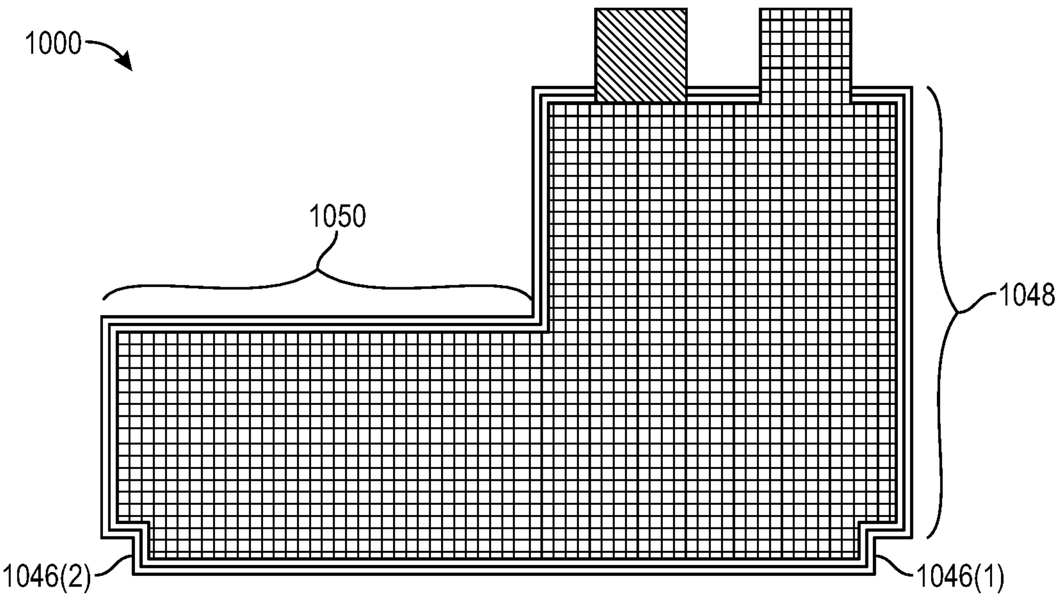
FIG. 10 shows a schematic view of a battery including movement arresting features, according to at least one example.

FIG. 10 shows a schematic view of a battery 1000 including movement arresting features, according to at least one example. The battery 1000 is an example of the battery 200. In FIG. 10, however, the battery 1000 includes a first battery part 1048 and a second battery part 1050. The first battery part 1048 may be electrically and physically connected to the second battery part 1050. For example, the first battery part 1048 and the second battery part 1050 may form a single battery cell housed within a single housing. The second battery part 1050 may be defined as having a rectangular body that extends substantially orthogonally from a rectangular body of the first battery part 1048. In this manner, the battery 1000 may generally have an “L” shape that may be referred to as a conformal battery because the parts 1048 and 1050 extend in different directions (e.g., the first battery part 1048 in a Y direction and the second battery part 1050 in an X direction).

The battery 1000 includes a set of enclosure notches and a set of corresponding battery cell notches, referred to collectively herein as battery notches 1046. The battery notches 1046 may be disposed at any location, position, and have any suitable orientation such as those shown and described with respect to other figures. As a specific illustrated example, the battery notches 1046, which may be of any suitable shape or size, may be located at subset of the corners of the battery 1000 such as those that are at adjacent an end of the battery 1000 opposite the electrode tabs. Thus, at least one battery notch 1046(1) may be formed in the first battery part 1048 and at least one battery notch 1046(2) may be formed in the second battery part 1050. In this manner, the battery notches 1046 may function to arrest movement of the entire battery 1000, or placement of the battery notches 1046 at other positions such as those shown in FIG. 2, may be used to arrest movement more so in one direction verses the other.

As illustrated, the battery notches 1046 may have a generally rectangular shape. In this example, the battery notches 1046 may include protrusions having only two sides, rather than those that include three sides, as illustrated in FIG. 2.

Figure 11:
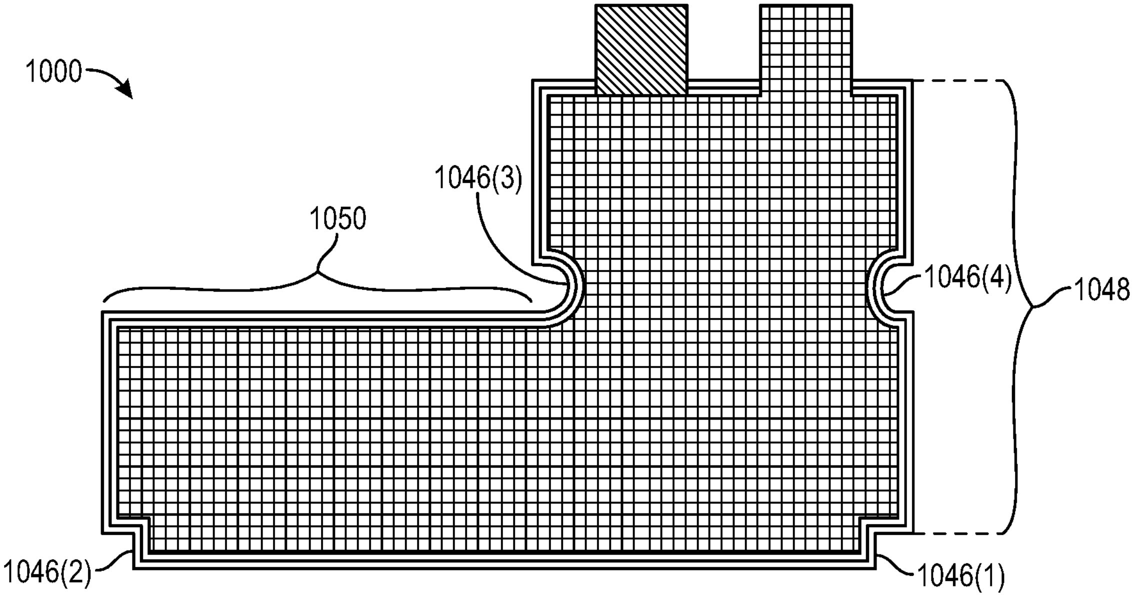
FIG. 11 shows a schematic view of a battery including movement arresting features, according to at least one example.

FIG. 11 shows a schematic view of the battery 1000 including movement arresting features, according to at least one example. In FIG. 11, two additional battery notches 1046(3) and 1046(4) have been added to the battery 1000. The battery notches 1046(3) and 1046(4) may be of a different type (e.g., size, shape, etc.) than the battery notches 1046(1) and 1046(2). The battery notches 1046(3) and 1046(4) may be implemented as a pair to arrest movement in a uniform manner. In some examples, at least the battery notch 1046(3) may provide additional benefits to the battery 1000. For example, depending on the type of enclosure used for the battery 1000, the battery notch 1046(3) may provide relief for bending or otherwise forming an enclosure that is required to bend at the intersection of the first battery part 1048 and the second battery part 1050 (e.g., where the battery notch 1046(3) is located).

Figure 12:
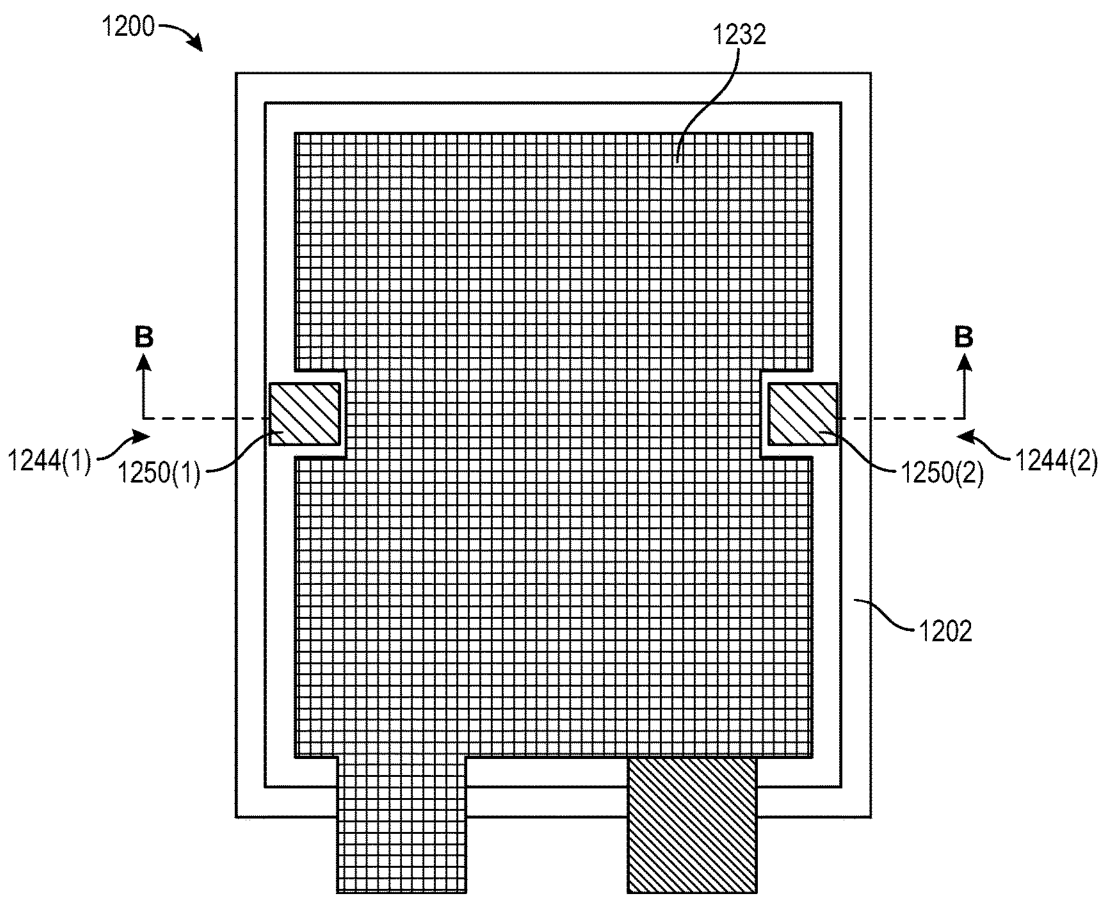
FIG. 12 shows a schematic view of a battery including movement arresting features, according to at least one example.
Figure 13:
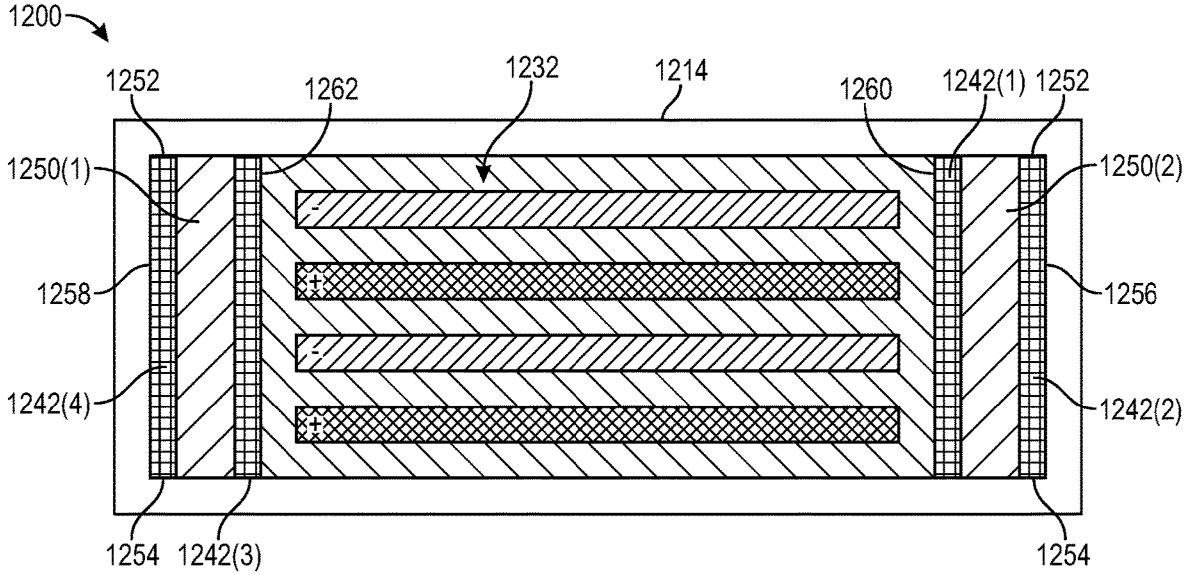
FIG. 13 shows a schematic cross-sectional view of the battery of FIG. 12, according to at least one example.

FIG. 12 shows a schematic view of a battery 1200 including movement arresting features, according to at least one example. FIG. 13 shows a cross-sectional view B-B of the battery 1200 including movement arresting features, according to at least one example. The battery 1200 is an example of the battery 200. Thus, the battery 1200 may include a battery cell 1232 housed within an enclosure 1202. Unlike the embodiments described previously, the embodiment illustrated in FIGS. 12 and 13, may include battery cell notches 1244(1) and 1244(2) but may not include any sort of enclosure notches. Instead, the battery 1200 includes a set of retaining elements 1250(1) and 1250(2). The retaining elements 1250 may be disposed between the battery cell 1232 and the enclosure 1202 within the battery cell notches 1244. The retaining elements 1250 may take any shape, but generally may extend between a first interior surface 1252 of the enclosure 1202 and a second interior surface 1254 of the enclosure 1202. The retaining elements 1250 may function to resist movement of the battery cell 1232 by “pinning” the battery cell 1232 within the enclosure 1202.

In some examples, the retaining elements 1250 may be formed from an adhesive material that is used to adhere opposing distal ends of the retaining elements 1250 to the surfaces 1252 and 1254. In some examples, an adhesive may be applied to at least some exterior surfaces of the retaining elements 1250 to adhere the retaining elements 1250 to the first interior surface 1252, the second interior surface 1254, a third interior surface 1256, a fourth interior surface 1258, a first cell surface 1260, and/or a second cell surface 1262.

In the illustrated embodiment, the battery 1200 includes void volumes 1242(1)-1242(4) for the purposes described previously herein. In some examples, at least some of the void volumes 1242(1)-1242(4) may be omitted. In these examples without some of the void volumes 1242, the retaining elements 1250 may be adhered or otherwise connected to surfaces that are about orthogonal with respect to the first interior surface 1252 and the second interior surface 1254 (e.g., the third interior surface 1256, the fourth interior surface 1258, the first cell surface 1254, and the second cell surface 1262).

The retaining elements 1250 may be formed from any suitable material configured to arrest movement of the battery cell 1232. For example, the retaining elements may be formed from elastic damper, AB glue, tape, metal, plastic, and the like. Examples of material suitable for the retaining elements may include Styrene-Isoprene-Styrene (SIS) Block Polymer, Styrene-Ethylene-Butylene-Styrene (SEBS) Block Polymer, Poly-IsoButene (PIB), Poly-Methyl MethArcylate (PMMA), an AB glue with a PMMA base. In some examples, the retaining elements 1250 may occupy all or substantially all of the volume defined by the battery cell notches 1244, which may be referred to as an electrode or cell protrusion volume (e.g., the volume defined by the notch in the electrode cell). The retaining elements 1250 may have any suitable shape such as rectangular, circular, cylindrical, and the like. In some examples, the retaining elements may be disposed at a location nearer a central region of the battery cell 1232 (e.g., away from the side walls of the enclosure 1202).

In some examples, any suitable number of battery cell notches 1244 and retaining elements 1250 may be provided in the battery 1200. For example, an additional set of battery cell notches 1244 and retaining elements 1250 may be placed in the same sides as illustrated in FIG. 12 (e.g., above and/or below those illustrated). Similarly, additional battery cell notches 1244 and retaining elements 1250 may be placed in opposite sides of the battery 1200. For example, a first battery cell notch 1244 and a corresponding retaining element 1250 may be placed in the end opposite the electrode tabs. In this example, a second battery cell notch 1244 and a corresponding retaining element 1250 may be placed in the end that includes the electrode tabs (e.g., spaced between the first electrode tab and the second electrode tab).

In the following, further clauses are described to facilitate the understanding of the present disclosure.

Clause 1. A battery, comprising:

an enclosure that defines an interior volume, wherein a first pair of notches is formed in the enclosure, wherein each notch of the first pair of notches comprises a protrusion that extends into the interior volume; and an electrode cell disposed within the interior volume, wherein a second pair of notches is formed in the electrode cell, wherein the first pair of notches is aligned with the second pair of notches, wherein each protrusion is configured to engage with one notch of the second pair of notches when the electrode cell moves within the enclosure.

Clause 2. The battery of clause 1, wherein a third pair of notches is formed in the enclosure, wherein a fourth pair of notches is formed in the electrode cell and is aligned with the third pair of notches.

Clause 3. The battery of clause 2, wherein individual first notches of the first pair of notches are formed on first opposing sides of the enclosure, and wherein individual third notches of the third pair of notches are formed on second opposing sides of the enclosure.

Clause 4. The battery of clause 1, wherein individual notches of the first pair of notches are positioned at opposing sides of the enclosure, and wherein individual notches of the second pair of notches are positioned at opposing sides of the electrode cell.

Clause 5. The battery of clause 1, wherein individual notches of the first pair of notches are formed at opposing corners of the enclosure, and wherein the individual notches of the second pair of notches are formed at opposing corners of the electrode cell.

Clause 6. The battery of clause 1, wherein the electrode cell comprises an electrode stack comprising a plurality of electrode layers, and wherein the second pair of notches extends through the plurality of electrode layers.

Clause 7. The battery of clause 1, wherein the enclosure comprises a composite pouch or a can.

Clause 8. The battery of clause 1, further comprising a pair of electrode tabs electrically connected to the electrode cell and extending through at least one side of the enclosure.

Clause 9. The battery of clause 1, further comprising an adhesive layer that connects an exterior surface of the electrode cell to an interior surface of the enclosure.

Clause 10. The battery of clause 1, wherein the first pair of notches is characterized by a first rectangular shape, and wherein the second pair of notches is characterized by a second rectangular shape that is smaller than the first rectangular shape.

Clause 11. The battery of clause 1, wherein the first pair of notches is characterized by a first arcuate shape, and wherein the second pair of notches is characterized by a second arcuate shape that is smaller than the first arcuate shape.

Clause 12. A system, comprising:

an electrode cell comprising a plurality of electrode layers, wherein a pair of electrode notches is formed in the electrode cell, wherein each electrode notch of the pair of electrode notches extends through the plurality of electrode layers, wherein the electrode cell is configured to occupy an enclosure;

a first electrode tab electrically connected to the electrode cell; and a second electrode tab electrically connected to the electrode cell.

Clause 13. The system of clause 12, further comprising the enclosure that defines an interior volume, and wherein the electrode cell occupies a majority of the interior volume, wherein the first electrode tab and the second electrode tab extend from first locations within the enclosure to second locations outside of the enclosure.

Clause 14. The system of clause 12, wherein a first enclosure notch is formed on a first side of the enclosure and comprises a first protrusion, and wherein a second enclosure notch is formed on a second side of the enclosure and comprises a second protrusion, wherein a first location of the first enclosure notch aligns with a second location of a first electrode notch of the pair of electrode notches when the electrode cell is contained within the enclosure.

Clause 15. The system of clause 12, wherein each electrode notch of the pair of electrode notches is configured to receive a protrusion formed in an enclosure that retains the electrode cell.

Clause 16. The system of clause 12, wherein the pair of electrode notches is formed at a pair of opposing portions of the electrode cell.

Clause 17. The system of clause 16, wherein the pair of opposing portions of the electrode cell comprise at least one of opposing sides or opposing corners.

Clause 18. A battery, comprising:

an enclosure defining an interior volume and characterized by an enclosure perimeter, wherein a plurality of enclosure protrusions is formed in the enclosure at the enclosure perimeter; and an electrode stack comprising a plurality of electrode layers disposed within the interior volume and characterized by a stack perimeter, wherein a plurality of electrode protrusions is formed in the electrode stack at the stack perimeter, and wherein the plurality of electrode protrusions is aligned with the plurality of enclosure protrusions.

Clause 19. The battery of clause 18, wherein alignment of the plurality of electrode protrusions with the plurality of enclosure protrusions resists lateral movement of the electrode stack with respect to the enclosure.

Clause 19. The battery of clause 18, wherein each electrode protrusion of the plurality of electrode protrusions comprises a notch that having a lateral width that extends from the stack perimeter towards a central portion of the electrode stack and depth that extends through each electrode layer of the plurality of electrode layers.

Clause 21. A battery, comprising:

an enclosure that defines an interior volume;

an electrode cell disposed within the interior volume, wherein a pair of notches is formed in the electrode cell; and a pair of retaining elements, wherein each retaining element of the pair of retaining elements is disposed within and extends outward from a respective notch of the pair of notches, wherein each retaining element of the pair of retaining elements is connected to the enclosure, and each retaining element of the pair of retaining elements is configured to engage with a respective notch of the pair of notches to arrest movement of the electrode cell with respect to the enclosure.

Clause 22. The battery of clause 21, wherein each retaining elements comprises a first end and a second end, and wherein each first end is physically connected to a first surface of the enclosure and each second end is physical connected to a second surface of the enclosure.

Clause 23. The battery of clause 21, wherein each retaining element of the pair of retaining elements is formed from at least one of glue, elastomeric material, or tape.

Clause 24. The battery of clause 21, wherein the electrode cell comprises an electrode stack comprising a plurality of electrode layers, and wherein the pair of notches extends through the plurality of electrode layers.

Clause 25. The battery of clause 21, wherein a second pair of notches is formed in the electrode cell, and wherein the battery further comprises a second pair of retaining elements disposed within and extending outwards from a respective notch of the second pair of notches.

Clause 26. The battery of clause 21, further comprising a pair of electrode tabs electrically connected to the electrode cell and extending through at least one side of the enclosure.

Clause 27. The battery of clause 21, further comprising an adhesive layer that connects an exterior surface of the electrode cell to an interior surface of the enclosure.

Clause 28. The battery of clause 21, wherein the pair of notches is characterized by a rectangular shape or an arcuate shape.

Clause 29. A system, comprising:

an electrode cell comprising a plurality of electrode layers, wherein a pair of electrode notches is formed in the electrode cell, wherein each electrode notch of the pair of electrode notches extends through the plurality of electrode layers;

a pair of retaining elements configured to retain the electrode cell via engagement with the pair of electrode notches;

a first electrode tab electrically connected to the electrode cell; and a second electrode tab electrically connected to the electrode cell.

Clause 30. The system of clause 29, further comprising an enclosure that defines an interior volume configured to retain the electrode cell.

Clause 31. The system of clause 30, wherein the first electrode tab and the second electrode tab extend from first locations within the enclosure to second locations outside of the enclosure.

Clause 32. The system of clause 30, wherein each retaining element of the pair of retaining elements is disposed within and extends outward from a respective electrode notch of the pair of electrode notches.

Clause 33. The system of clause 30, wherein each retaining element of the pair of retaining elements is connected to the enclosure.

Clause 34. The system of clause 30, wherein each retaining element of the pair of retaining elements is configured to engage with a respective electrode notch of the pair of electrode notches to arrest movement of the electrode cell with respect to the enclosure.

Clause 35. The system of clause 30, wherein each retaining element comprises a first end and a second end, and wherein each first end is physically connected to a first surface of the enclosure and each second end is physical connected to a second surface of the enclosure.

Clause 36. The system of clause 35, wherein the first surface comprises a first interior surface of the enclosure and the second surface comprises a second interior surface of the enclosure, and wherein the first surface is positioned opposite the second surface.

Clause 37. The system of clause 29, wherein the plurality of electrode layers are formed as a stack or a roll.

Clause 38. A battery, comprising:

an enclosure defining an interior volume and characterized by an enclosure perimeter;

an electrode stack comprising a plurality of electrode layers disposed within the interior volume and characterized by a stack perimeter, wherein an electrode protrusion is formed in the electrode stack at the stack perimeter and defines an electrode protrusion volume; and a retaining element occupying a portion of the electrode protrusion volume adjacent the enclosure perimeter and configured to arrest movement of the electrode stack relative to the enclosure.

Clause 39. The battery of clause 38, wherein the electrode protrusion comprises a notch that having a lateral width that extends from the stack perimeter towards a central portion of the electrode stack and depth that extends through each electrode layer of the plurality of electrode layers.

Clause 40. The battery of clause 38, wherein the retaining element is disposed within and extends outward from the electrode protrusion volume.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A battery, comprising:

an enclosure that defines an interior volume;

an electrode cell disposed within the interior volume, wherein a pair of notches is formed in the electrode cell; and a pair of movement retaining elements, wherein each movement retaining element of the pair of movement retaining elements is disposed within and extends outward from a respective notch of the pair of notches, wherein each movement retaining element of the pair of movement retaining elements is physically connected to the enclosure, and each movement retaining element of the pair of movement retaining elements is configured to physically engage with the respective notch of the pair of notches to arrest movement of the electrode cell with respect to the enclosure.

2. The battery of claim 1, wherein each movement retaining element comprises a first end and a second end, and wherein each first end is physically connected to a first surface of the enclosure and each second end is physically connected to a second surface of the enclosure.

3. The battery of claim 1, wherein each movement retaining element of the pair of movement retaining elements is formed from at least one of glue, elastomeric material, or tape.

4. The battery of claim 1, wherein the electrode cell comprises an electrode stack comprising a plurality of electrode layers, and wherein the pair of notches extends through the plurality of electrode layers.

5. The battery of claim 1, wherein a second pair of notches is formed in the electrode cell, and wherein the battery further comprises a second pair of movement retaining elements disposed within and extending outwards from a respective notch of the second pair of notches.

6. The battery of claim 1, further comprising an adhesive layer that connects an exterior surface of the electrode cell to an interior surface of the enclosure.

7. The battery of claim 1, wherein the pair of notches is characterized by a rectangular shape or an arcuate shape.

8. A system, comprising:

an electrode cell comprising a plurality of electrode layers, wherein a pair of electrode notches is formed in the electrode cell, wherein each electrode notch of the pair of electrode notches extends through the plurality of electrode layers;

a pair of movement retaining elements configured to retain the electrode cell via physical engagement with the pair of electrode notches;

a first electrode tab electrically connected to the electrode cell; and a second electrode tab electrically connected to the electrode cell.

9. The system of claim 8, further comprising an enclosure that defines an interior volume configured to retain the electrode cell.

10. The system of claim 9, wherein the first electrode tab and the second electrode tab extend from first locations within the enclosure to second locations outside of the enclosure.

11. The system of claim 9, wherein each movement retaining element of the pair of movement retaining elements is disposed within and extends outward from a respective electrode notch of the pair of electrode notches and is connected to the enclosure.

12. The system of claim 9, wherein each movement retaining element of the pair of movement retaining elements is configured to engage with a respective electrode notch of the pair of electrode notches to arrest movement of the electrode cell with respect to the enclosure.

13. The system of claim 9, wherein each movement retaining element comprises a first end and a second end, and wherein each first end is physically connected to a first surface of the enclosure and each second end is physically connected to a second surface of the enclosure, and wherein the first surface comprises a first interior surface of the enclosure and the second surface comprises a second interior surface of the enclosure, and wherein the first surface is positioned opposite the second surface.

14. A battery, comprising:

an enclosure defining an interior volume and characterized by an enclosure perimeter;

an electrode stack comprising a plurality of electrode layers disposed within the interior volume and characterized by a stack perimeter, wherein an electrode protrusion is formed in the electrode stack at the stack perimeter and defines an electrode protrusion volume; and a movement retaining element occupying a portion of the electrode protrusion volume adjacent the enclosure perimeter and configured to physically arrest movement of the electrode stack relative to the enclosure.

15. The battery of claim 14, wherein the electrode protrusion comprises a notch that having a lateral width that extends from the stack perimeter towards a central portion of the electrode stack and depth that extends through each electrode layer of the plurality of electrode layers.

16. The battery of claim 14, wherein the movement retaining element is disposed within and extends outward from the electrode protrusion volume.

17. The battery of claim 1, wherein the pair of notches comprises at least two notches, with a first notch formed at a first side of the electrode cell and a second notch formed at a second side of the electrode cell that is opposite the first side.

18. The battery of claim 1, wherein the pair of movement retaining elements are separate and distinct structures from the enclosure and the electrode cell.

19. The battery of claim 1, wherein each movement retaining element is disposed entirely within the interior volume of the enclosure.

20. The battery of claim 1, wherein each notch of the pair of notches is defined by a notch volume, and wherein each movement retaining element of the pair of movement retaining elements extends through the notch volume.

* * * * *